United States Patent
Hamada

(10) Patent No.: US 9,042,088 B2
(45) Date of Patent: May 26, 2015

(54) BATTERY-MOUNTING STRUCTURE

(71) Applicant: KABUSHIKI KAISHA TOSHIBA, Minato-ku, Tokyo (JP)

(72) Inventor: Tomohiro Hamada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 13/789,365

(22) Filed: Mar. 7, 2013

(65) Prior Publication Data

US 2013/0182393 A1     Jul. 18, 2013

Related U.S. Application Data

(63) Continuation of application No. 13/269,390, filed on Oct. 7, 2011, now Pat. No. 8,416,561.

(30) Foreign Application Priority Data

Dec. 24, 2010    (JP) ................................ 2010-288822

(51) Int. Cl.
     *G06F 1/16*        (2006.01)
     *H01M 2/10*      (2006.01)

(52) U.S. Cl.
     CPC ............ *G06F 1/1635* (2013.01); *G06F 1/1681* (2013.01); *G06F 1/1683* (2013.01); *H01M 2/1055* (2013.01)

(58) Field of Classification Search
     CPC ....................................................... G06F 1/1635
     USPC ..................................................... 361/679.27
     See application file for complete search history.

(56) References Cited

U.S. PATENT DOCUMENTS

| | | | |
|---|---|---|---|
| 5,243,549 A | 9/1993 | Oshiba | |
| 5,583,744 A | 12/1996 | Oguchi et al. | |
| 5,927,997 A | 7/1999 | Ruland et al. | |
| 6,078,496 A | 6/2000 | Oguchi et al. | |
| 6,191,941 B1 * | 2/2001 | Ito et al. | 361/679.27 |
| 6,385,041 B1 | 5/2002 | Choi | |
| 6,473,296 B2 | 10/2002 | Amemiya et al. | |
| 6,961,240 B2 | 11/2005 | Janicek | |
| 7,602,606 B2 | 10/2009 | Schlesener et al. | |
| 7,957,127 B2 * | 6/2011 | Minaguchi et al. | 361/679.17 |
| 8,142,926 B2 * | 3/2012 | Ke | 429/186 |
| 8,693,181 B2 * | 4/2014 | Tseng et al. | 361/679.27 |
| 2001/0046116 A1 | 11/2001 | Amemiya et al. | |
| 2003/0007322 A1 * | 1/2003 | Amemiya et al. | 361/683 |
| 2003/0213101 A1 | 11/2003 | Lin | |

(Continued)

FOREIGN PATENT DOCUMENTS

| | | |
|---|---|---|
| JP | 05-291757 | 11/1993 |
| JP | 11-195407 | 7/1999 |

(Continued)

*Primary Examiner* — Anthony Q Edwards
(74) *Attorney, Agent, or Firm* — Knobbe, Martens, Olson & Bear LLP

(57) ABSTRACT

According to one embodiment, a battery-mounting structure includes a first housing, a second housing including a display device including a display screen, a hinge configured to attach the second housing to the first housing rotatably between a first position in which the display screen is covered with the first housing and a second position in which the display screen is exposed, and a battery configured to be attached to the first housing and including a recess configured to accommodate a part of the second housing in the second position.

20 Claims, 13 Drawing Sheets

(56) References Cited

U.S. PATENT DOCUMENTS

| | | |
|---|---|---|
| 2007/0047183 A1 | 3/2007 | Goto et al. |
| 2008/0123286 A1 | 5/2008 | Watanabe et al. |
| 2009/0169982 A1 | 7/2009 | Goto |
| 2010/0118481 A1 | 5/2010 | Wang |
| 2011/0076523 A1 | 3/2011 | Iwamoto et al. |
| 2011/0157806 A1 | 6/2011 | Yamamoto et al. |
| 2012/0162957 A1 | 6/2012 | Hamada et al. |

FOREIGN PATENT DOCUMENTS

| | | |
|---|---|---|
| JP | 2001-318732 | 11/2001 |
| JP | 2004-227420 A | 8/2004 |
| JP | 2005-165637 | 6/2005 |
| JP | 2010-249209 A | 11/2010 |

* cited by examiner

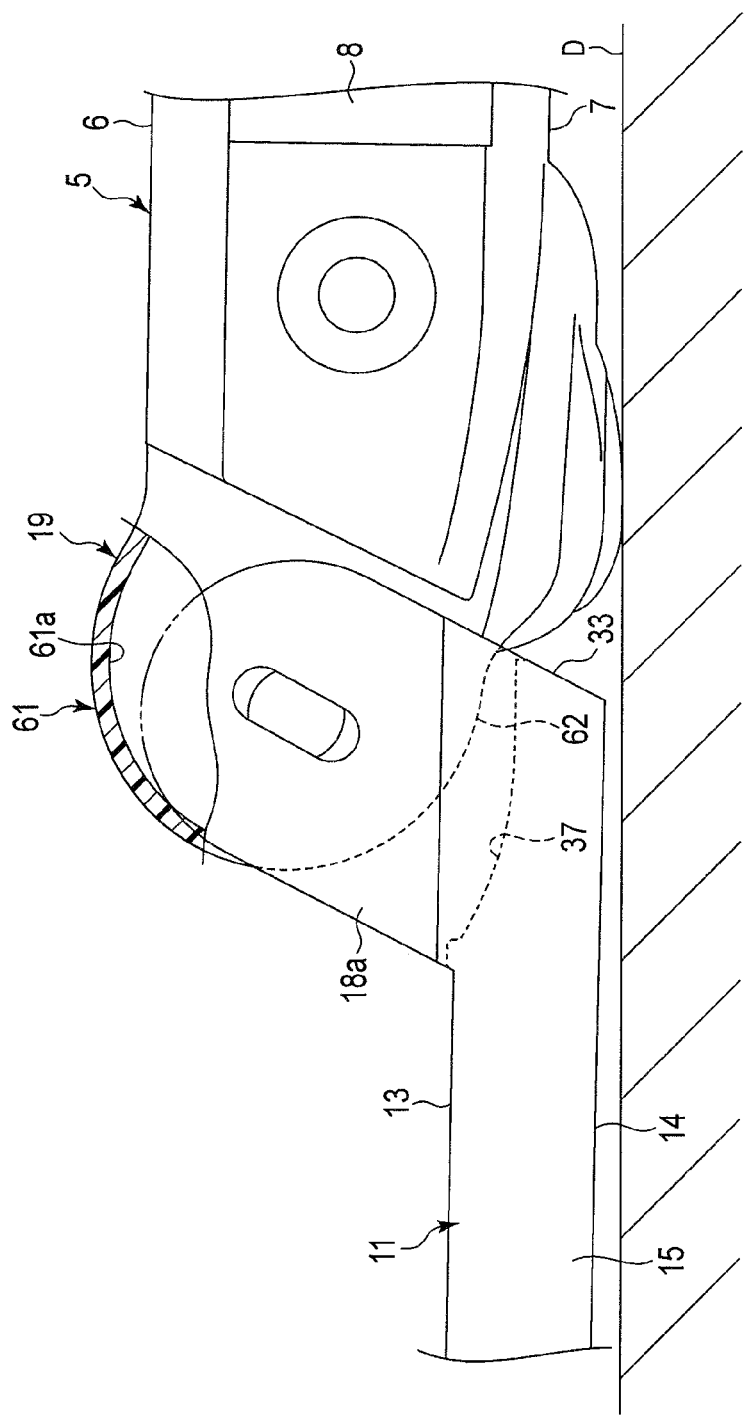
F I G. 12

BATTERY-MOUNTING STRUCTURE

CROSS-REFERENCE TO RELATED APPLICATIONS

This application is a continuation of U.S. patent application Ser. No. 13/269,390, filed Oct. 7, 2011, which is based upon and claims the benefit of priority from the Japanese Patent Application No. 2010-288822, filed Dec. 24, 2010; the entire contents of each of which are incorporated herein by reference.

FIELD

Embodiments described herein relate generally to a battery-mounting structure.

BACKGROUND

An electronic apparatus comprises a battery attached to a main housing.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 12 is an exemplary side view of the electronic apparatus shown in FIG. 1.

DETAILED DESCRIPTION

Figure 1:
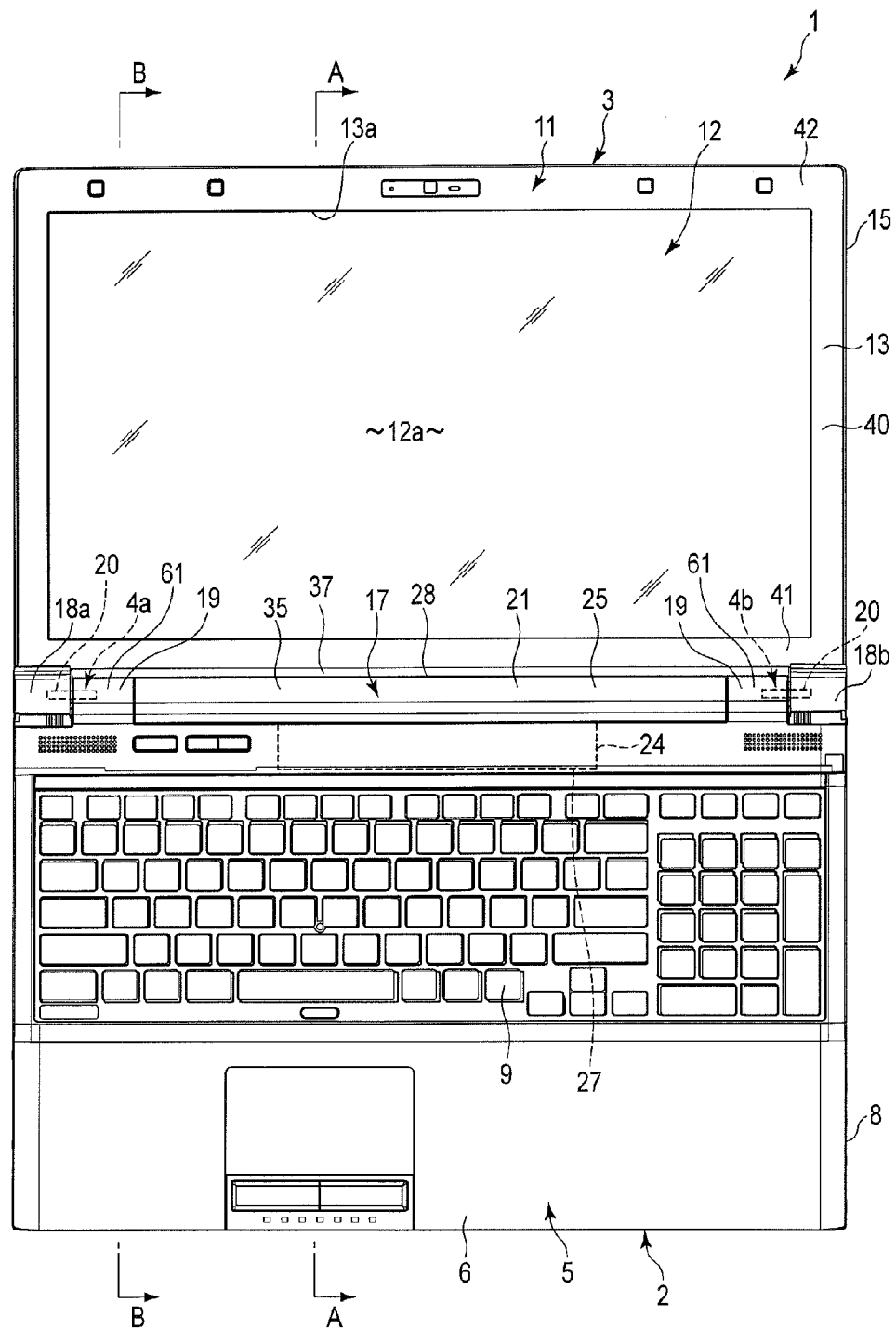
FIG. 1 is an exemplary plan view of an electronic apparatus according to a first embodiment.

Various embodiments will be described hereinafter with reference to the accompanying drawings.

In general, according to one embodiment, a battery-mounting structure comprises a first housing, a second housing comprising a display device comprising a display screen, a hinge configured to attach the second housing to the first housing rotatably between a first position in which the display screen is covered with the first housing and a second position in which the display screen is exposed, and a battery configured to be attached to the first housing and comprising a recess configured to accommodate a part of the second housing in the second position.

Referring to the drawings, embodiments will be described below.

FIGS. 1-12 show an electronic apparatus 1 according to one embodiment. The electronic apparatus 1 is, for example, a notebook computer. The electronic apparatus to which the present embodiment is applicable is not limited to the above. The present embodiment is widely applicable to various electronic apparatuses including a cellular phone, smartphone, personal digital assistant (PDA) and game console. The electronic apparatus 1 is an example of the "battery-mounting structure".

Figure 2:
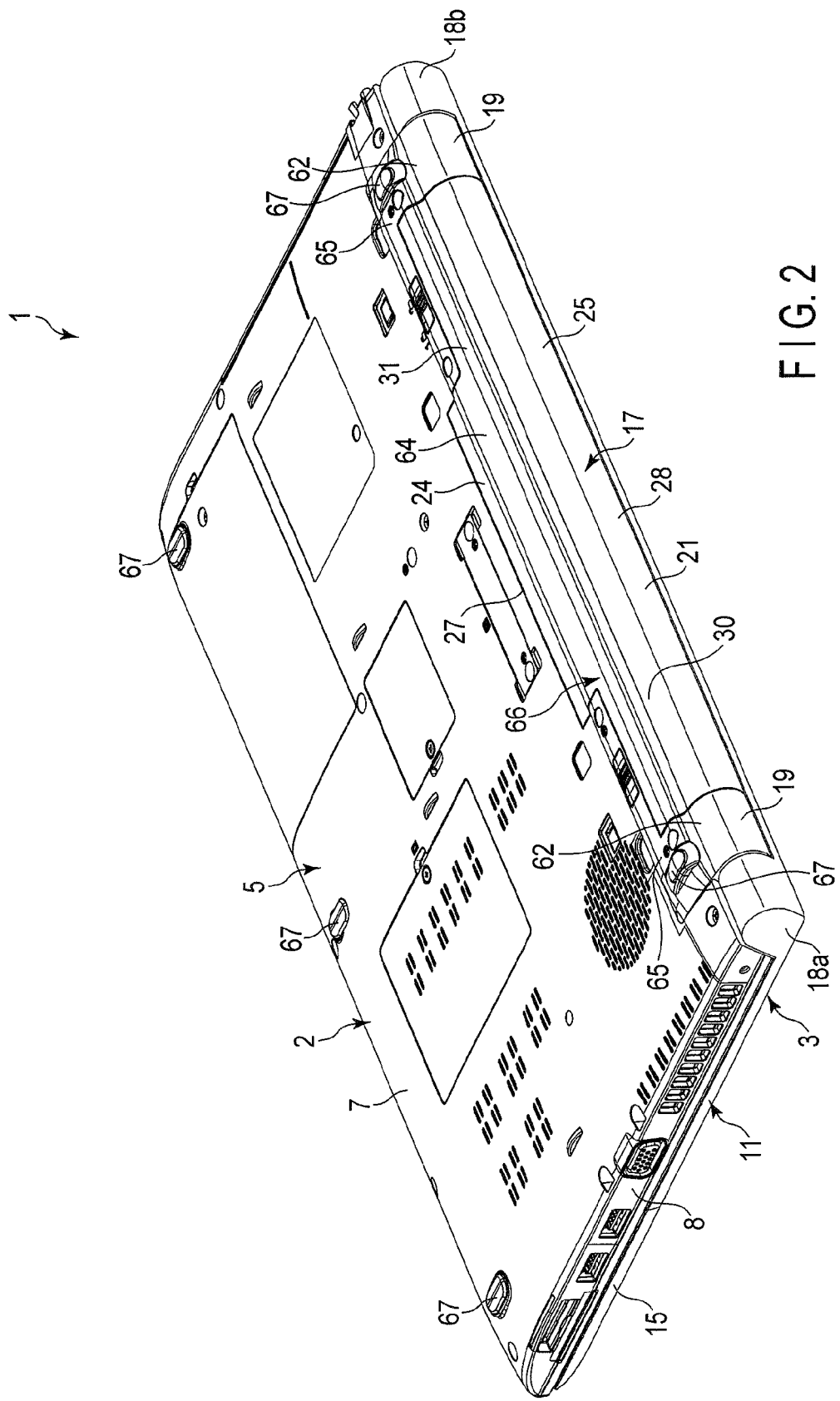
FIG. 2 is an exemplary perspective view showing the undersurface of the electronic apparatus shown in FIG. 1.

As shown in FIG. 1, the electronic apparatus 1 comprises a main unit 2 (first unit), a display unit 3 (second unit), and a pair of hinges 4a, 4b. The main unit 2 is an electronic apparatus main body accommodating a main board. The main unit 2 comprises a main housing 5. The main housing 5 is an example of a "first housing." As shown in FIGS. 1 and 2, the main housing 5 comprises an upper wall 6, a lower wall 7, and a peripheral wall 8, and takes the form of a flat box.

Figure 3:
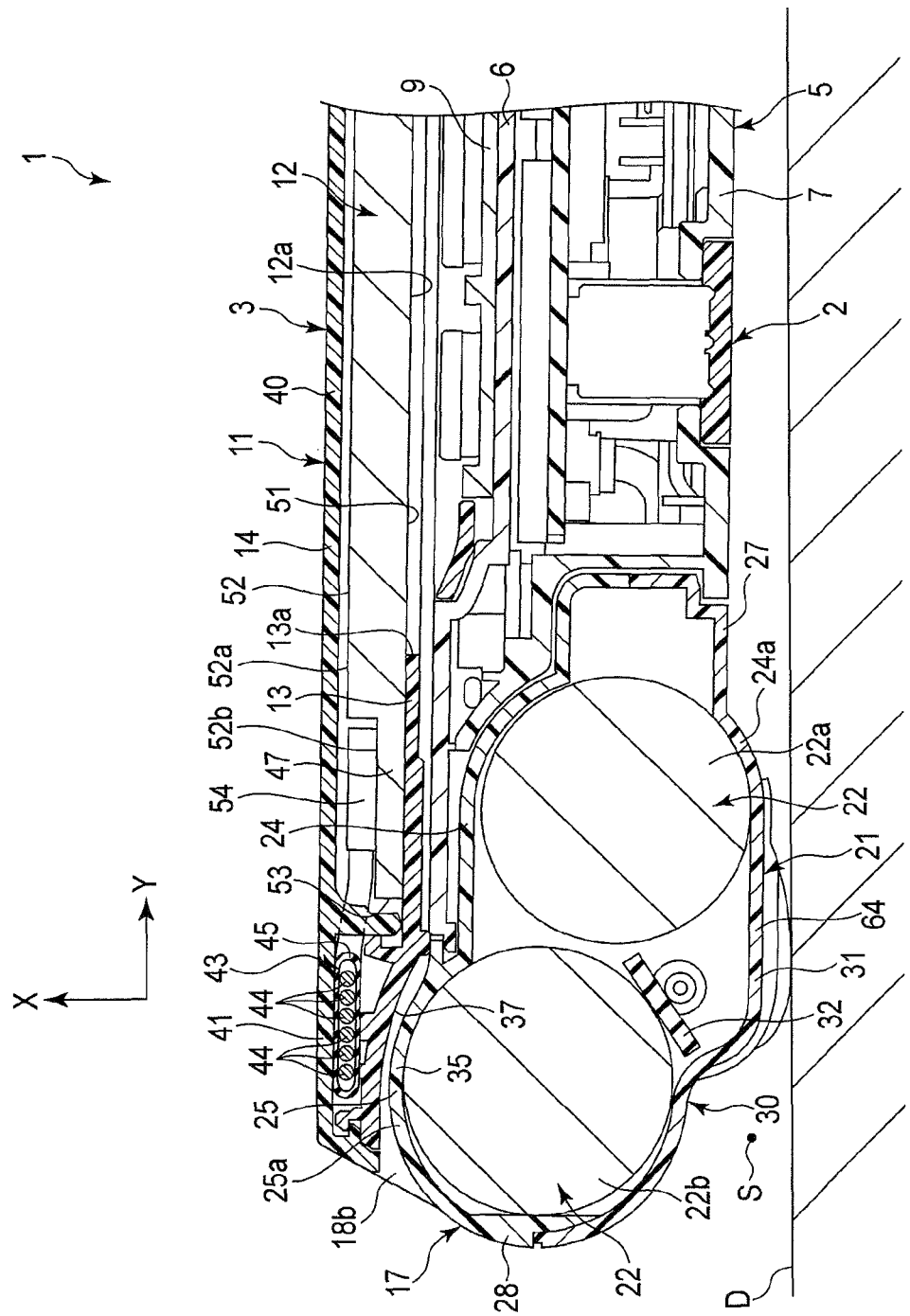
FIG. 3 is an exemplary sectional view taken along line A-A of the electronic apparatus shown in FIG. 1.

When the electronic apparatus 1 is placed on a desk, the lower wall 7 faces the desk surface D (see FIG. 3). The lower wall 7 is substantially parallel to the desk surface D. The upper wall 6 extends substantially parallel to the lower wall 7 (i.e., extends substantially horizontally) with a space between the upper wall 6 and lower wall 7. A keyboard 9 is attached to the upper wall 6. The keyboard 9 is an example of an "input portion." As the input portion, another inputting mechanism, such as a touch panel, may be used. The peripheral wall 8 stands relative to the lower wall 7, and connects a peripheral portion of the lower wall 7 to a peripheral portion of the upper wall 6.

The display unit 3 is rotatably (openably) connected to a rear end portion of the main unit 2 by hinges 4a, 4b. The display unit 3 is rotatable between a first position in which the display unit 3 is tilted to cover the main unit 2 from above and a second position in which the display unit 3 is open relative to the main unit 2.

As shown in FIG. 1, the display unit 3 comprises a display housing 11 and a display device 12 accommodated in the display housing 11. The display housing 11 is an example of a "second housing." The display housing 11 comprises a front wall 13, a rear wall 14, and a peripheral wall 15. The display device 12 is, for example, a liquid crystal display, but is not limited to it. The display apparatus 12 comprises a display screen 12a on which images are displayed.

When the display unit 3 is in the first position, the front wall 13 of the display housing 11 faces the main unit 2. The front wall 13 comprises an opening portion 13a at which the display screen 12a of the display device 12 is exposed. In other words, the display housing 11 is coupled by the hinges 4a, 4b to the main housing 5 rotatably between the first position in which the display screen 12a is covered with the main housing 5 and the second position in which the display screen 12a is exposed.

The rear wall 14 extends substantially parallel to the front wall 13 with a space between the rear wall 14 and the front wall 13. The peripheral wall 15 stands relative to the front wall 13 and rear wall 14, and connects a peripheral portion of the front wall 13 to a peripheral portion of the rear wall 14. The front wall 13 is an example of a "first wall." The rear wall 14 is an example of a "second wall." The rear wall 14 faces the display device 12 from the opposite side of the front wall 13.

As shown in FIGS. 1 and 2, a battery pack 17 is attached to a rear end portion of the main housing 5. The battery pack 17 is an example of the "battery." The display housing 11 comprises a pair of protrusions 18a, 18b separately provided on the right and left ends of the display housing 11. The protrusions 18a, 18b protrude from the display housing 11 to the respective sides of the battery pack 17.

As shown in FIG. 1, a hinge attachment portion 19 is provided between each of the protrusions 18a, 18b and the battery pack 17. The hinge attachment portion 19 is part of the rear end portion of the main housing 5. The hinges 4a, 4b each have a hinge rotation shaft 20. The hinge rotation shaft 20 is substantially parallel to an axial direction of a cell (described later) of the battery pack 17.

The hinge rotation shaft 20 extends between the protrusion 18a, 18b of the display housing 11 and the hinge attachment portion 19 of the main housing 5, and attached to and supported by the protrusion 18a, 18b and the hinge attachment portion 19. With this structure, the display screen 11 rotates around the hinge rotation shaft 20 relative to the main housing 5.

First, the structure of the battery pack 17 will be described.

Figure 4:
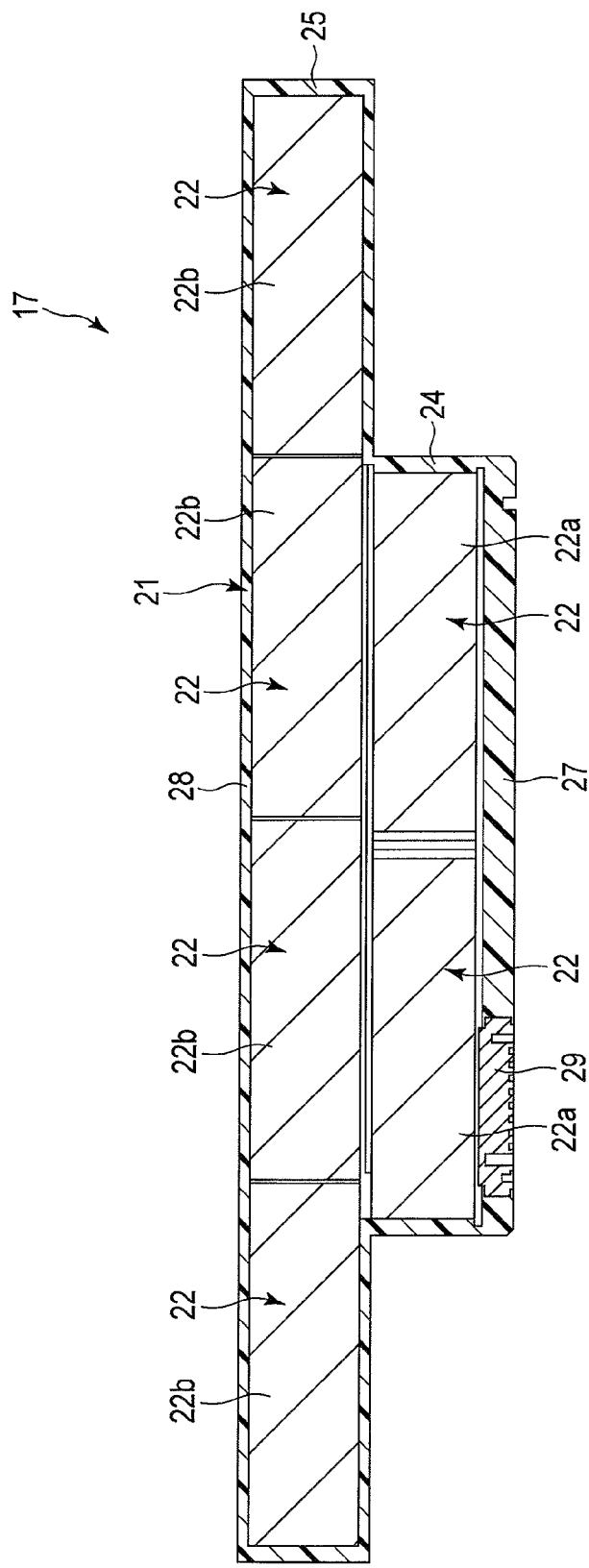
FIG. 4 is an exemplary sectional view of a battery pack of the electronic apparatus shown in FIG. 1.

As shown in FIGS. 3 and 4, the battery pack 17 comprises a case 21 (battery case) and cells 22 (battery cell) accommodated in the case 21. The cells 22 each take the form of a cylinder, such as a dry cell battery. The case 21 accommodates, for example, six cells 22.

As shown in FIGS. 3 and 4, the cells 22 are aligned in front and rear rows. The cells 22 include first cells 22a in the first row (front row), and second cells 22b in the second row (rear row). In this specification, "front," "rear," "left," and "right" are defined from the user's point of view. Namely, the front is the user side, and the rear is the side opposite to the user side.

As shown in FIG. 4, two first cells 22a are aligned in the first row, and four second cells 22b are aligned in the second row. The first cells 22a and the second cells 22b are aligned in series, i.e., in an axial direction of the cells 22, in their respective rows.

As shown in FIG. 3, the battery pack 17 comprises a first portion 24 (front portion) accommodating the first cells 22a, and a second portion 25 (rear portion) accommodating the second cells 22b. The first portion 24 comprises a first arc portion 24a curved along the outer contour of the first cell 22a. The second portion 25 comprises a second arc portion 25a curved along the outer contour of the second cell 22b. The second portion 25 is farther from a center portion of the main housing 5 than the first portion 24. Namely, the second portion 25 is farther from the keyboard 9 than the first portion 24. The first portion 24 and the second portion 25 are integral with each other.

The second portion 25 is shifted to the display housing 11 in the first position relative to the first portion 24. More specifically, the second cell 22b is located at a higher level than the first cell 22a. The first portion 24 and the second portion 25 are provided substantially along the outer contours of the first cell 22a and the second cell 22b, respectively. Therefore, the second portion 25 is lifted relative to the first portion 24, and bulges to a higher level than the first portion 24.

The battery pack 17 comprises a first end portion 27, which is a front end portion, and a second end portion 28, which is a rear end portion. The first end portion 27 is adjacent to the main housing 5, and provided with a connecter 29 (see FIG. 4) to the main housing 5. The second end portion 28 is located opposite to the first end portion 27, i.e., opposite to the main housing 5, and forms part of the exterior of the electronic apparatus 1.

Since the second portion 25 is shifted to the above relative to the first portion 24, a concave portion 30 (first concave portion) is provided in the second end portion 28 of the battery pack 17. The concave portion 30 is an example of "first recess". The concave portion 30 is provided in a lower end portion of the battery pack 17.

The concave portion 30 corresponds to the difference in level between the first portion 24 and the second portion 25. Namely, the concave portion 30 is a space portion formed under the second portion 25 by shifting the second portion 25 to the above to be positioned at a higher level than the first portion 24. Space S is defined between the concave portion 30 and the desk surface D on which the main housing 5 is placed.

Figure 5:
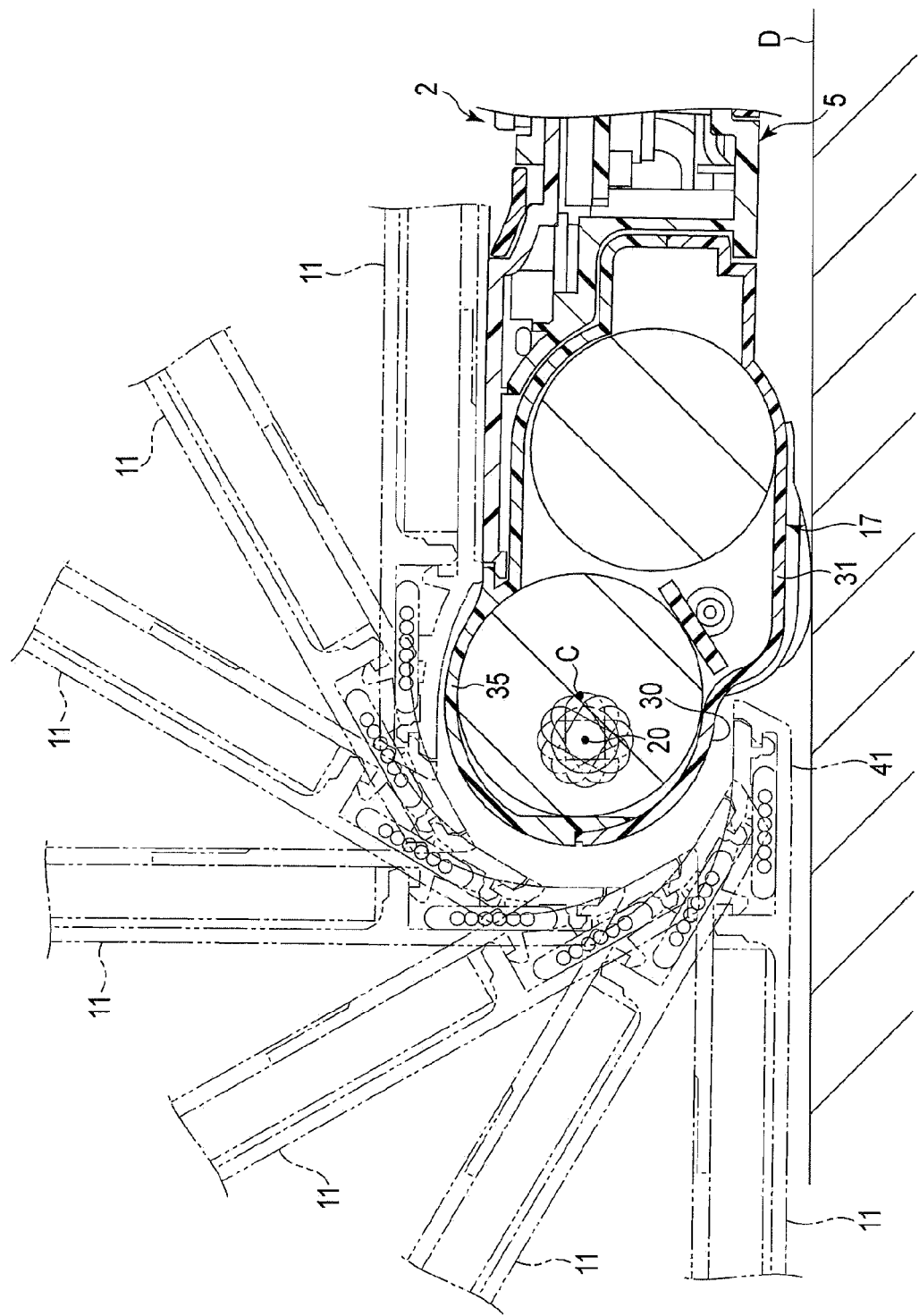
FIG. 5 is an exemplary sectional view taken along line A-A of the electronic apparatus shown in FIG. 1.

As shown in FIG. 5, when the display housing 11 is in the second position, a part of the display housing 11 is accommodated in the concave portion 30 of the battery pack 17. Namely, when the display housing 11 is in the second position, the part of the display housing 11 enters under the second portion 25 of the battery pack 17 into the space S between the concave portion 30 and the desk surface D. Accordingly, the part of the display housing 11 is accommodated in the space S between the concave portion 30 and the desk surface D.

As shown in FIG. 5, in the second position, the display housing 11 opens, for example, substantially 180 degrees relative to the first position. When the display housing 11 is in the second position, in which the display housing 11 opens substantially 180 degrees relative to the first position, the part of the display housing 11 enters into the space S between the concave portion 30 and the desk surface D. In other words, since the part of the display housing 11 enters into the space S, the display housing 11 can open substantially 180 degrees relative to the first position. The display housing 11 may not necessarily open substantially 180 degrees, or may open more than substantially 180 degrees.

As shown in FIG. 5, the hinge rotation shaft 20 is shifted from the center of the second end portion 28 of the battery pack 17. The center of the second end portion 28 of the battery pack 17 is the center C of the second cell 22b of the battery pack 17 in the present embodiment. The hinge rotation shaft 20 is located farther from the display housing 11 in the first position than the center C of the second cell 22b.

More specifically, the hinge rotation shaft 20 is located lower than the center C of the second cell 22b. Further, the hinge rotation shaft 20 is shifted rearward from the center C of the second cell 22b. Namely, the hinge rotation shaft 20 is farther from the first cell 22a than the center C of the second cell 22b.

Figure 6:
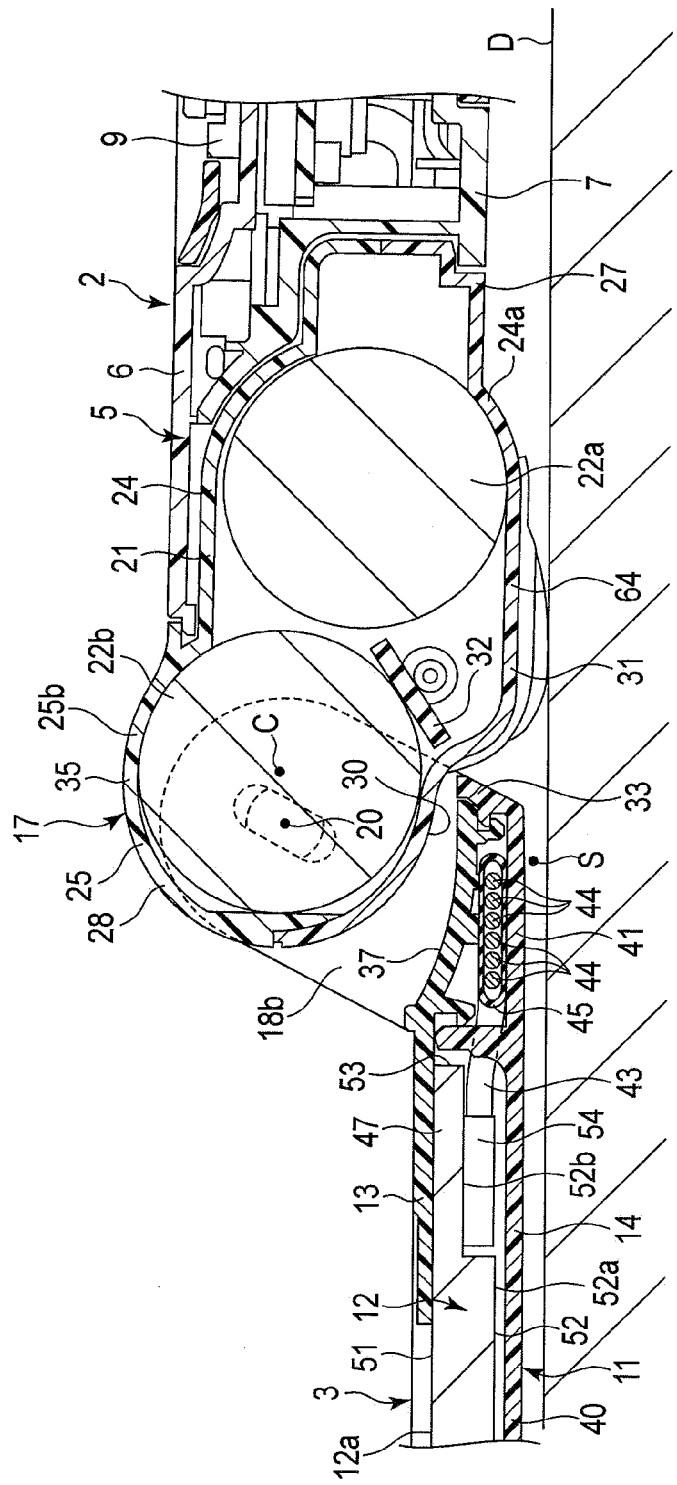
FIG. 6 is an exemplary sectional view taken along line A-A of the electronic apparatus shown in FIG. 1.

As shown in FIG. 6, the battery pack 17 comprises a bulge 31 protuberant relative to the outer contours of the first cell 22a and second cell 22b between the first portion 24 and the second portion 25. The bulge 31 is provided in correspondence with the degree of the difference in level between the first portion 24 and the second portion 25. The bulge 31 accommodates a functional component 32. An example of the functional component 32 is a circuit board for stabilizing the operation of the cells 22. The functional component 32 is not limited to the above example.

When the display housing 11 is in the second position, an end portion 33 of the display housing 11 comes into contact with the bulge 31 of the battery pack 17. The hinges 4a, 4b of the present embodiment may not have a stopper. The rotation of the display housing 11 is restricted by the part of the display housing 11 coming into contact with the bulge 31 of the battery pack 17. In other words, the bulge 31 serves as a stopper for restricting the rotation of the display housing 11.

Namely, since the battery pack 17 is provided with the bulge 31, the hinges 4a, 4b need not be provided with a stopper.

Figure 7:
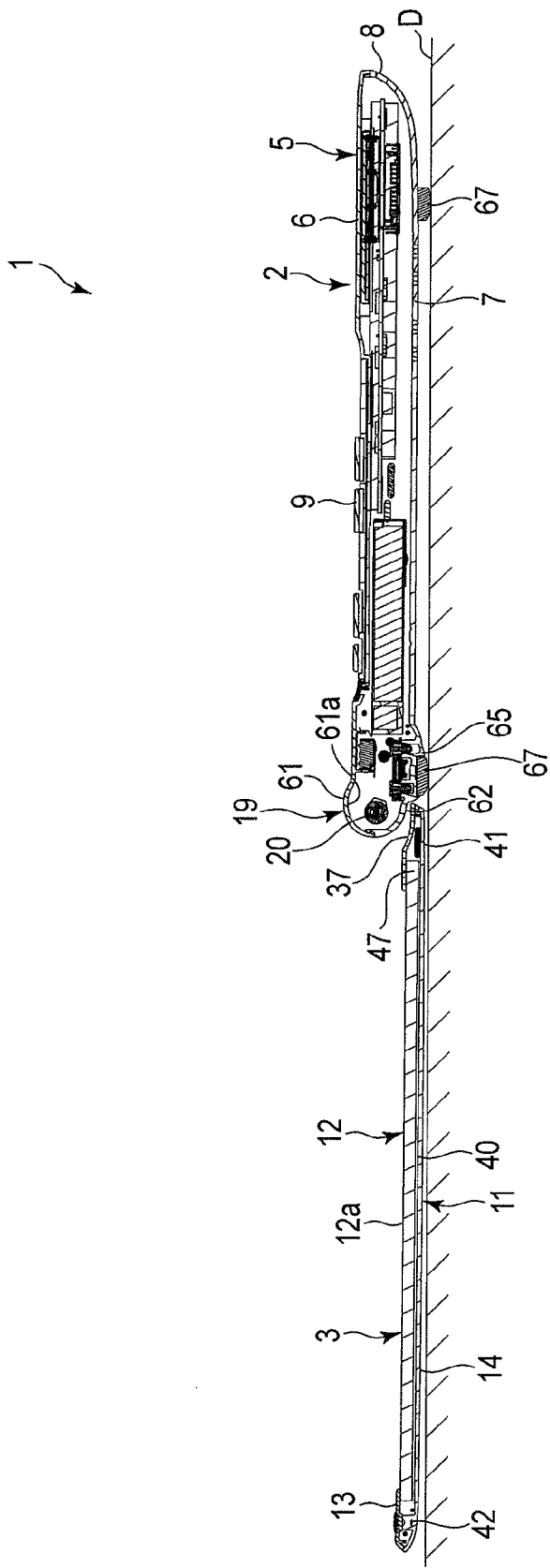
FIG. 7 is an exemplary sectional view taken along line B-B of the electronic apparatus shown in FIG. 1.

As shown in FIG. 7, in the second position, the display housing 11 is located below the upper surface of the keyboard 9 and the upper surface of the battery pack 17, and the rear wall 14 of the display housing 11 is substantially on the same level as the lower wall 7 of the main housing 5.

Next, the structure of the display housing 11 will be described.

As shown in FIG. 3, the second portion 25 of the battery pack 17 is shifted to the above relative to the first portion 24, and bulges to a higher level than the first portion 24. Therefore, the battery pack 17 is provided with a convex portion 35 (first convex portion) directed to the display housing 11 in the first position. The convex portion 35 is an example of the "first projection".

The display housing 11 comprises a concave portion 37 (second concave portion) corresponding to the convex portion 35 of the battery pack 17. The concave portion 37 is an example of the "second recess". When the display housing 11 is in the first position, the concave portion 37 faces the convex portion 35 of the battery pack 17, and at least part of the convex portion 35 of the battery pack 17 enters and accommodated in the concave portion 37 of the display housing 11.

Figure 8:
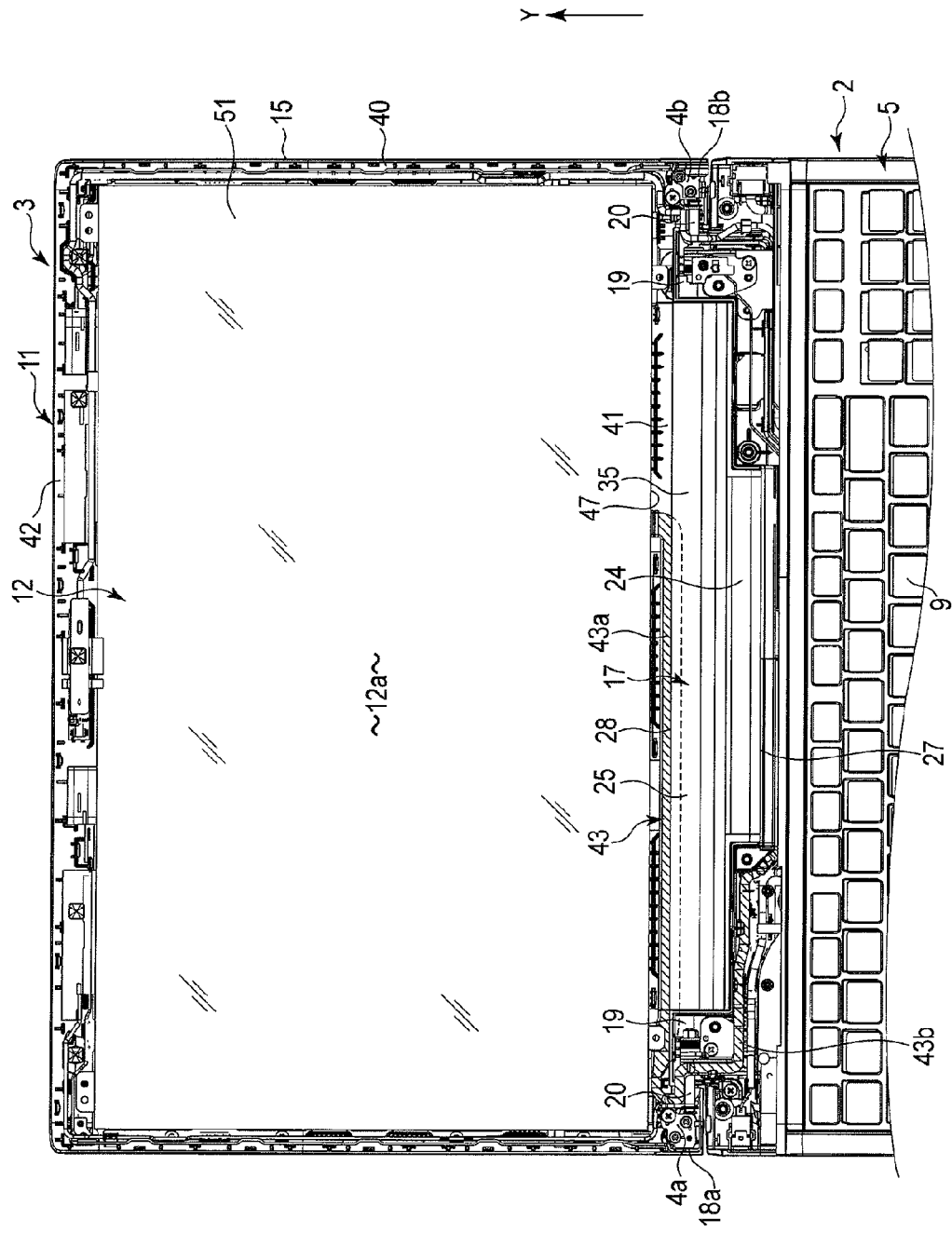
FIG. 8 is an exemplary plan view showing the inside of the display housing of the electronic apparatus shown in FIG. 1.
Figure 9:
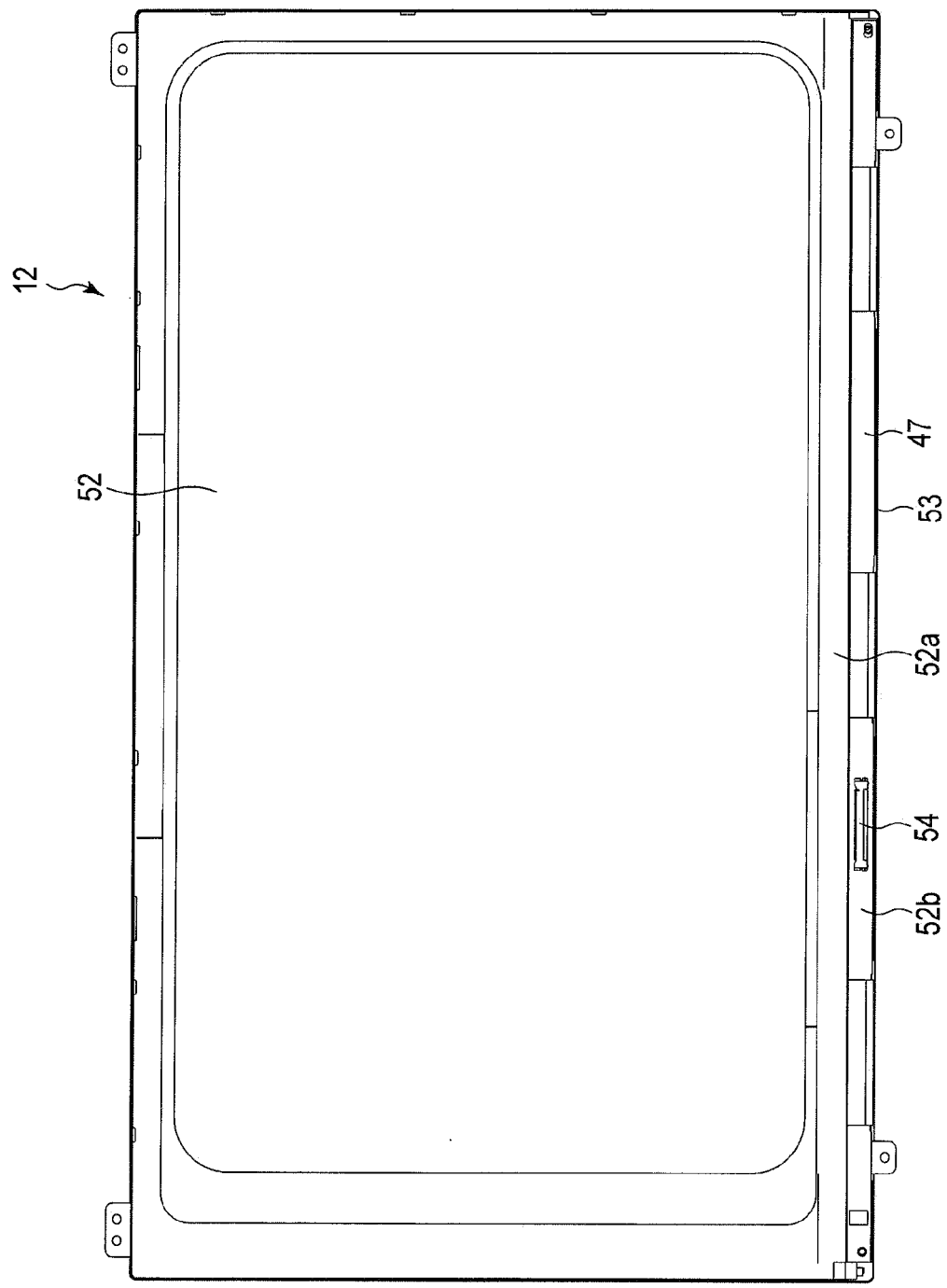
FIG. 9 is an exemplary rear elevational view of the display device shown in FIG. 8.
Figure 10:
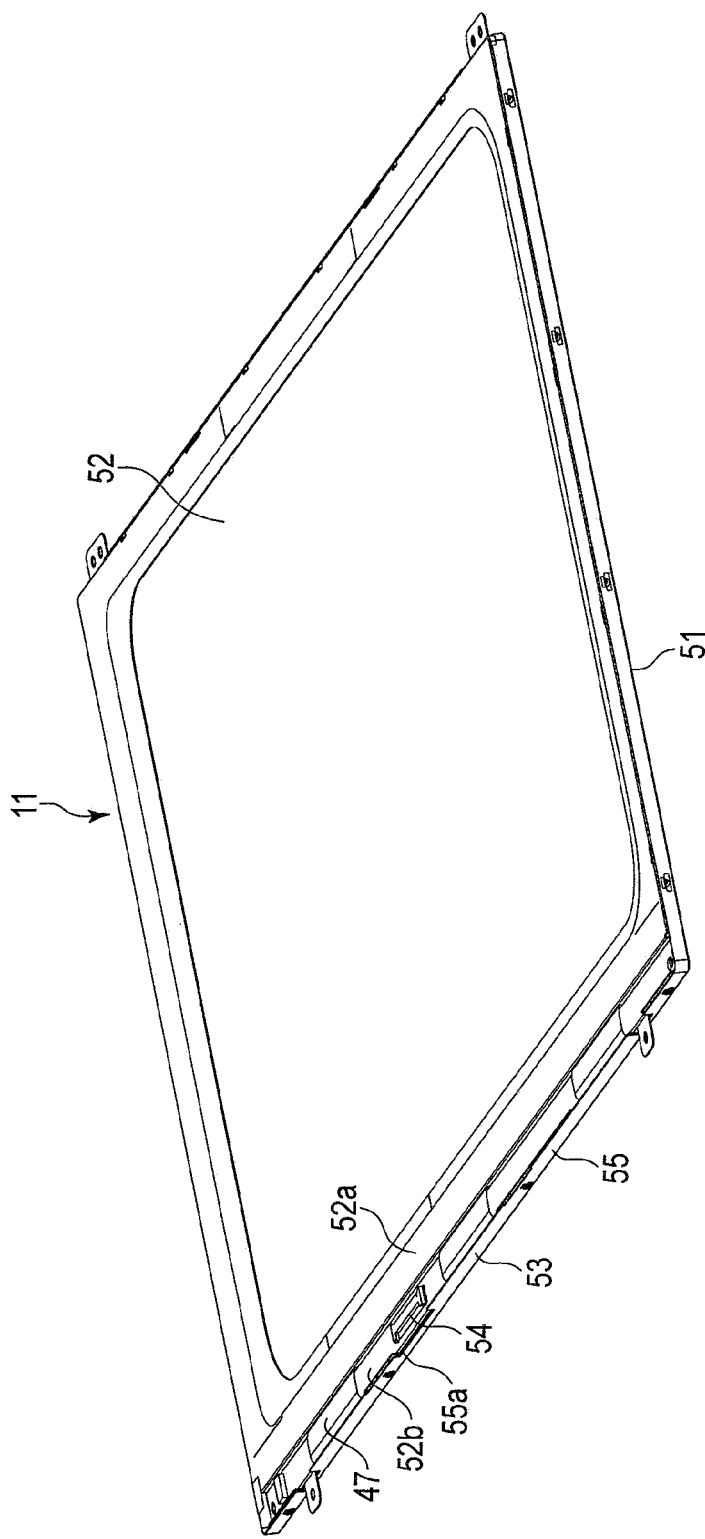
FIG. 10 is an exemplary perspective view showing the back surface of the display device shown in FIG. 8.

As shown in FIG. 8, the display housing 11 comprises a main portion 40, a first end portion 41 and a second end portion 42. The main portion 40 accommodates the display device 12. The first end portion 41 and the second end portion 42 do not overlap the display device 12. The first end portion 41 is connected to the hinges 4a, 4b, and serves as a lower end portion of the display housing 11 when the display housing 11 stands. The second end portion 42 is located opposite to the first end portion 41, and serves as an upper end portion of the display housing 11 when the display housing 11 stands.

As shown in FIG. 3, the concave portion 37 is provided in the first end portion 41 of the display housing 11. Since the concave portion 37 is provided, the first end portion 41 of the display housing 11 is thinner than the other portion of the display housing 11, such as the main portion 40. As shown in FIG. 6, the thinner first end portion 41 enters and accommodated in the space S between the concave portion 30 of the battery pack 17 and the desk surface D when the display housing 11 is in the second position.

As shown in FIG. 1, the concave portion 37 extends in the width direction of the display housing 11 along the first end portion 41 of the display housing 11. The concave portion 37 extends between the pair of protrusions 18a, 18b.

Next, an installation structure of the display housing 11 will be described.

As shown in FIGS. 3 and 8, the display housing 11 accommodates a harness 43. In FIG. 8, the harness 43 is indicated by hatching for convenience of explanation. The harness 43 is a bundle of a plurality of cables 44. The harness 43 comprises a protection member 45 which brings the cables 44 together and covers them. The protection member 45 is formed of, for example, an insulating material.

As shown in FIG. 8, the harness 43 is accommodated in the first end portion 41 of the display housing 11. The display device 12 comprises an end portion 47 extending along the concave portion 37. The harness 43 comprises a first portion 43a extending along the end portion 47 of the display device 12, and a second portion 43b extending into one protrusion 18a of the display housing 11.

As shown in FIGS. 3 and 8, the cables 44 are arranged abreast in the first portion 43a so that the first portion 43a is flat. As shown in FIG. 3, the cables 44 each face the concave portion 37 of the display housing 11 in a thickness direction of the display housing 11 (first direction X). The cables 44 are aligned in a direction crossing the thickness direction of the display housing 11. In the present embodiment, the cables 44 are aligned in a direction substantially orthogonal to the thickness direction of the display housing 11 (second direction Y).

As shown in FIGS. 3 and 8, the first portion 43a of the harness 43 extends along the concave portion 37 of the display device 11. In the first portion 43b of the harness 43, at least a part of each of the cables 44 faces the display device 12 in the second direction Y.

As shown in FIGS. 3 and 8-10, the display device 12 comprises a front surface 51 comprising the display screen 12a, a back surface 52 located opposite to the front surface 51, and a peripheral surface which stands relative to the front surface 51 and back surface 52 and connects a peripheral portion of the front surface 51 to a peripheral portion of the back surface 52. The front surface 51 is an example of a "first surface."

The back surface 52 comprises a first portion 52a farthest from the front surface 51 in the back surface 52, and a second portion 52b recessed relative to the first portion 52a. Namely, the distance between the front surface 51 and the first portion 52a of the back surface 52 is the maximum thickness of the display device 12. In the second portion 52b, the display device 12 is thinner than in the first portion 52a. The surface of the first portion 52a is an example of a "second surface."

The second portion 52b is provided in the end portion 47 of the display device 12. The second portion 52b is provided with a connector 54 to which the harness 43 is connected. The thickness of the connector 54 is substantially the same as or smaller than the difference in level between the first portion 52a and the second portion 52b. Therefore, the connector 54 is located in the maximum thickness of the display device 12, and is not substantially outstanding relative to the first portion 52a. Namely, the connector 54 is provided between the first surface and the second surface.

The display device 12 comprises a frame 55 forming the peripheral surface 53 of the display device 12. The frame 55 comprises a cutout portion 55a corresponding to the connector 54. The cutout portion 55a faces the connector 54, and exposes the connector 54 in an inserting direction of the harness 43.

As shown in FIGS. 3 and 8, the harness 43 is connected to the connector 54 in the end portion 47 of the display device 12. The harness 43 is connected to the display device 12 in the maximum thickness of the display device 12. The phrase "connected to the display device 12 in the maximum thickness of the display device 12" means that the harness 43 is connected to the display device 12 between the first surface and the second surface. As shown in FIG. 8, the harness 43 extends from the end portion 47 of the display device 12 to an area facing the concave portion 37.

As shown in FIG. 8, in the second portion 43b of the harness 43, the cables 44 are bundled in a columnar form. Therefore, the second portion 43a is thicker than the first portion 43a. The second portion 43b is guided from the protrusion 18a of the display housing 11 to the hinge attachment portion 19 of the main housing 5, and extends into the main housing 5.

Figure 11:
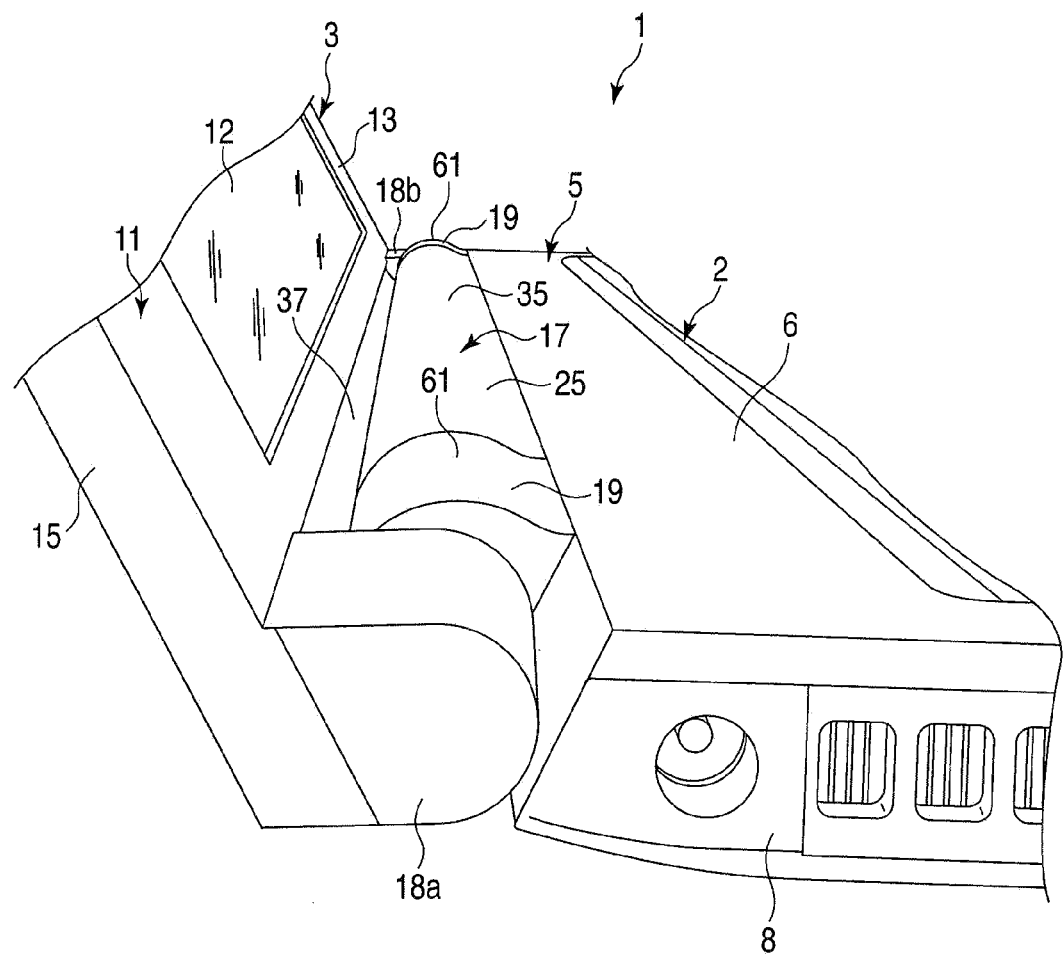
FIG. 11 is an exemplary perspective view showing a neighborhood of a hinge of the electronic apparatus shown in FIG. 1.

As shown in FIGS. 11 and 12, the upper surface of the hinge attachment portion 19 is swollen to have substantially the same outer contour as the upper surface of the second portion 25 of the battery pack 17. Namely, the hinge attachment portion 19 comprises a convex portion 61 directed to the display housing 11 in the first position. The convex portion 61 is an example of the "second projection". The convex portion 61 of the hinge attachment portion 19 is continuous with the convex portion 35 of the battery pack 17. At least a part of the convex portion 61 of the hinge attachment portion 19 faces the concave portion 37 of the display housing 11 in the first position, and is accommodated in the concave portion 37.

As shown in FIG. 12, the inner surface 61a of the convex portion 61 of the hinge attachment portion 19 is a curved surface bulging to the outside of the main housing 5 along the outer contour of the convex portion 61. Therefore, the inner space of the hinge attachment portion 19 is larger than the inner space of the other area of the main housing 5. When the display housing 11 rotates relative to the main housing 5, the harness 43 is loosened and tightened. The harness 43 can be loosened and tightened within the inner space of the convex portion 61. Namely, the harness 43 can be loosened and tightened within the relatively large inner space of the convex portion 61. Consequently, the stress applied to the harness 43 is reduced.

As shown in FIG. 2, the lower surface of the hinge attachment portion 19 is depressed to have substantially the same outer contour as the lower surface of the battery pack 17. Namely, the lower surface of the hinge attachment portion 19 comprises a concave portion 62 continuous with the concave portion 30 of the battery pack 17. Like the concave portion 30 of the battery pack 17, a part of the display housing 11 is accommodated in the concave portion 62 of the hinge attachment portion 19 when the display housing 11 is in the second position.

As shown in FIG. 4, the first end portion 27 of the battery pack 17 accommodates the connector 29. As shown in FIG. 3, the first end portion 27 is thinner than the first portion 24, and a step is formed between the first end portion 27 and the first portion 24 based on the difference in thickness therebetween. In other words, the first portion 24 protrudes lower than the other portion in the battery pack 17, thereby forming a protrusion 64 of the battery pack 17.

As shown in FIG. 2, the rear end portion of the main housing 5 comprises another protrusion 65 continuous with the protrusion 64 of the battery pack 17. The protrusion 64 of the battery pack 17 and the protrusion 65 of the main housing 5 are continuous with each other, and form a series of protrusion 66 extending over substantially the total width of the main housing 5 on the lower surface of the rear end portion of the main housing 5. The protrusion 66 comprises a leg 67 of the main housing 5, and serves as a grip which a user can put their hand when the user carries the electronic apparatus 1.

This structure enables a larger rotatable angle of the display housing 11. More specifically, the battery pack 17 of the present embodiment comprises, in its rear end portion, the concave portion 30 in which part of the display housing 11 is accommodated when the display housing 11 is in the second position. This concave portion 30 enables the display housing 11 to rotate to a larger angle without coming into contact with the main housing 5 or the battery pack 17, thereby increasing the rotatable angle of the display housing 11.

Further, since the concave portion 30 is provided in the lower end portion of the battery pack 17, the electronic apparatus 1 looks thinner when viewed from behind the electronic apparatus 1. This structure contributes to improvement in design.

In the present embodiment, the battery pack 17 comprises the first portion 24 accommodating the first cells 22a and the second portion 25 accommodating the second cells 22b. The battery pack 17 is provided with the concave portion 30 by shifting the second portion 25 relative to the first portion 24. With those structures, the capacity of the battery can be secured even though the concave portion 30 is provided, and provision of the concave portion 30 does not much create a dead space.

In the present embodiment, the concave portion 30 of the battery pack 17 defines a space S between the concave portion 30 and the desk surface D, in which part of the display housing 11 is accommodated. With this structure, even if the thickness (size) of the concave portion 30 of the battery pack 17 is reduced to some extent, the concave portion 30 can sufficiently accommodate a part of the display housing 11. Therefore, the thickness of the electronic apparatus 1 can be reduced by reducing the size of the concave portion 30 of the battery pack 17.

In the present embodiment, the display housing 11 is rotatable between the first position and the second position in which the display housing 11 is open substantially 180 degrees relative to the first position. With this structure, the electronic apparatus 1 can be used in a full open state. Further, since the electronic apparatus 1 can be used with the display housing 11 substantially 180 degrees open, if the electronic apparatus 1 comprises, for example, a touch panel to provide the display screen 12a with an inputting function, the display housing 11 is supported by the desk surface D as well as the hinges 4a, 4b, and an inputting operation can be easily performed.

Further, since the display housing 11 can open substantially 180 degrees, better attachment of the harness 43 can be achieved. Namely, an assembly operation can be performed with the display housing 11 substantially 180 degrees open. With this structure, the harness 43 can be attached to the electronic apparatus 1 in the most tightened state. Therefore, the harness 43 is not tightened too much in an ordinary use, the load on the harness 43 is reduced, and the possibility of, for example, breaking of the harness 43 can be lowered.

For comparison, let us assume that the hinge rotation shaft 20 matches the center C of the second cell 22b. In this case, when the display housing 11 rotates through a predetermined angle less than 180 degrees, the display housing 11 comes into contact with the battery pack 17, and a further rotation of the display housing 11 is restricted.

In contrast, in the present embodiment, the hinge rotation shaft 20 is located farther from the display housing 11 in the first position than the center C of the second cell 22b, for example, located lower than the center C of the second cell 22b. With this structure, the display housing 11 can avert contact with the battery pack 17 and the main housing 5, and rotate through a greater angle.

In the present embodiment, the hinge rotation shaft 20 is located farther than the first cell 22a than the center C of the second cell 22b, i.e., shifted to the rear side of the electronic apparatus 1. With this structure, even if the depth (horizontal depth) of the concave portion 30 of the battery pack 17 is small, the concave portion 30 can accommodate a part of the display housing 11 rotated to the second portion. In other words, the battery pack 17 can be provided with the bulge 31, and the installation space within the battery pack 17 can be increased.

In the present embodiment, the display housing 11 comprises the pair of protrusions 18a, 18b protruding from the display housing 11 to the respective sides of the battery pack 17, and the protrusions 18a, 18b are each supported by the hinge rotation shaft 20. With this structure, the hinge rotation shaft 20 can be easily located farther from the display housing 11 in the first position than the center C of the second cell 22b.

In the present embodiment, the battery pack 17 comprises the bulge 31 protuberant relative to the outer contours of the first cell 22a and second cell 22b between the first portion 24 and the second portion 25. The bulge 31 accommodates the functional component 32. Namely, by taking the advantage of the difference in level between the first portion 24 and the second portion 25, the bulge 31 corresponding to the difference in level is provided, and an additional installation space is produced within the battery pack 17. By providing the functional component 32 in such a bulge 31, high-density mounting is enabled.

In the present embodiment, the display housing 11 faces the second portion 25 of the battery pack 17 when the display housing 11 is in the first position, and comprises the concave portion 37 in which a part of the second portion 25 is accommodated. With this structure, even though the second portion 25 of the battery pack 17 is shifted to the above relative to the first portion 24, the concave portion 37 of the display housing 11 can compensate for the protuberance of the second portion 25, and the electronic apparatus 1 can be suppressed from being thicker. This structure contributes to realization of a thinner electronic apparatus.

In the first end portion 41 of the display housing 11, the display device 12 is not provided. Therefore, the first end portion 41 tends to be a dead space. In the present embodiment, the concave portion 37 is provided in the first end portion 41 of the display housing 11. Namely, the concave portion 37 is provided by effectively using the dead space of the first end portion 41.

In the present embodiment, the first end portion 41 of the display housing 11 is provided with the concave portion 37 and is thinner than another portion of the display housing 11, and the thinner first end portion 41 is accommodated in the concave portion 30 of the battery pack 17 when the display housing 11 is in the second position. With this structure, a large rotatable angle of the display housing 11 can be secured even when the concave portion 30 of the battery pack 17 is small (narrow). Namely, the electronic apparatus 11 can be made thinner by reducing the size of the concave portion 30.

Next, another aspect of the structure of the present embodiment will be described.

With the structure of the present embodiment, a thinner and higher-density mounting electronic apparatus can be realized. More specifically, in the present embodiment, the electronic apparatus 1 comprises the main housing 5 to which the battery pack 17 provided with the convex portion 35 is attached, and the display housing 11 provided with the concave portion 37 corresponding to the convex portion 35 of the battery pack 17. With this structure, the concave portion 37 of the display housing 11 can compensate for the protuberance of the convex portion 35 of the battery pack 17, and the electronic apparatus 11 can be made thinner.

In the present embodiment, the plurality of cables 44 are mounted in the first end portion 41 of the display housing 11 provided with the concave portion 37, and are arranged abreast in a direction crossing the thickness direction of the display housing 11. With this structure, the first end portion 41 of the display housing 11, inside of which is narrowed by providing the concave portion 37, is effectively used to mount components. Accordingly, high-density mounting of the electronic apparatus 1 is enabled.

In the present embodiment, the display housing 11 comprises the main portion 40 in which the display device 12 is accommodated, the first end portion 41 not overlapping the display device 12. The concave portion 37 is provided in the first end portion 41. With this structure, since the concave portion 37 does not overlap the display device 12, the concave portion 37 can be easily provided in the display housing 11, and the concave portion 37 may be formed relatively deep.

In the present embodiment, the concave portion 37 extends along the end portion 41 of the display housing 11, and the harness 43 comprises the first end portion 43a extending along the concave portion 37. With this structure, the inner space of the relatively large portion corresponding to the concave portion 37 can be effectively used, and much higher-density mounting of the electronic apparatus 1 is enabled.

In the present embodiment, the display device 12 comprises the end portion 47 extending along the concave portion 37, and the cables 44 are connected to the end portion 47 of the display device 12 and extend from the end portion 47 of the display device 12 to an area facing the concave portion 37. With this structure, the cables 44 can be mounted by effectively using the space of the first end portion 41 of the display housing 11, not the spaces on the right and left sides of the display device 12.

In the present embodiment, the display device 12 comprises the first surface comprising the display screen 12a, the second surface opposite to the first surface, and the connector 54 between the first surface and the second surface. The cables 44 are connected to the connector 54. This structure makes it possible to form the display housing 11 thinner.

In the present embodiment, at least a part of the cables 44 faces the display device 12 in a direction substantially orthogonal to the thickness direction of the display housing 11. With this structure, the cables 44 can extend from the display device 12 to the first end portion 41 of the display housing 11 without being bent much. Therefore, the electronic apparatus 1 can be made much thinner, and much higher-mounting of the electronic apparatus 1 is enabled.

In the present embodiment, an end portion of the main housing 5 comprises the convex portion 61 continuous with the convex portion 35 of the battery pack 17. The cables 44 are guided from the display housing 11 to the end portion of the main housing 5 through one of the pair of protrusions 18a, 18b, and can be tightened and loosened in the space within the convex portion 61. With this structure, a part of the cables 44 which are loosened when the display unit 3 is closed can be accepted by the swelled space in the convex portion 61, and the stress applied to the cables 44 can be reduced. Consequently, the possibility of breaking of the cables 44 can be lowered, and reliability of the electronic apparatus 1 can be improved.

Next, referring to FIG. 13, a modification of the electronic apparatus 1 will be described.

Figure 13:
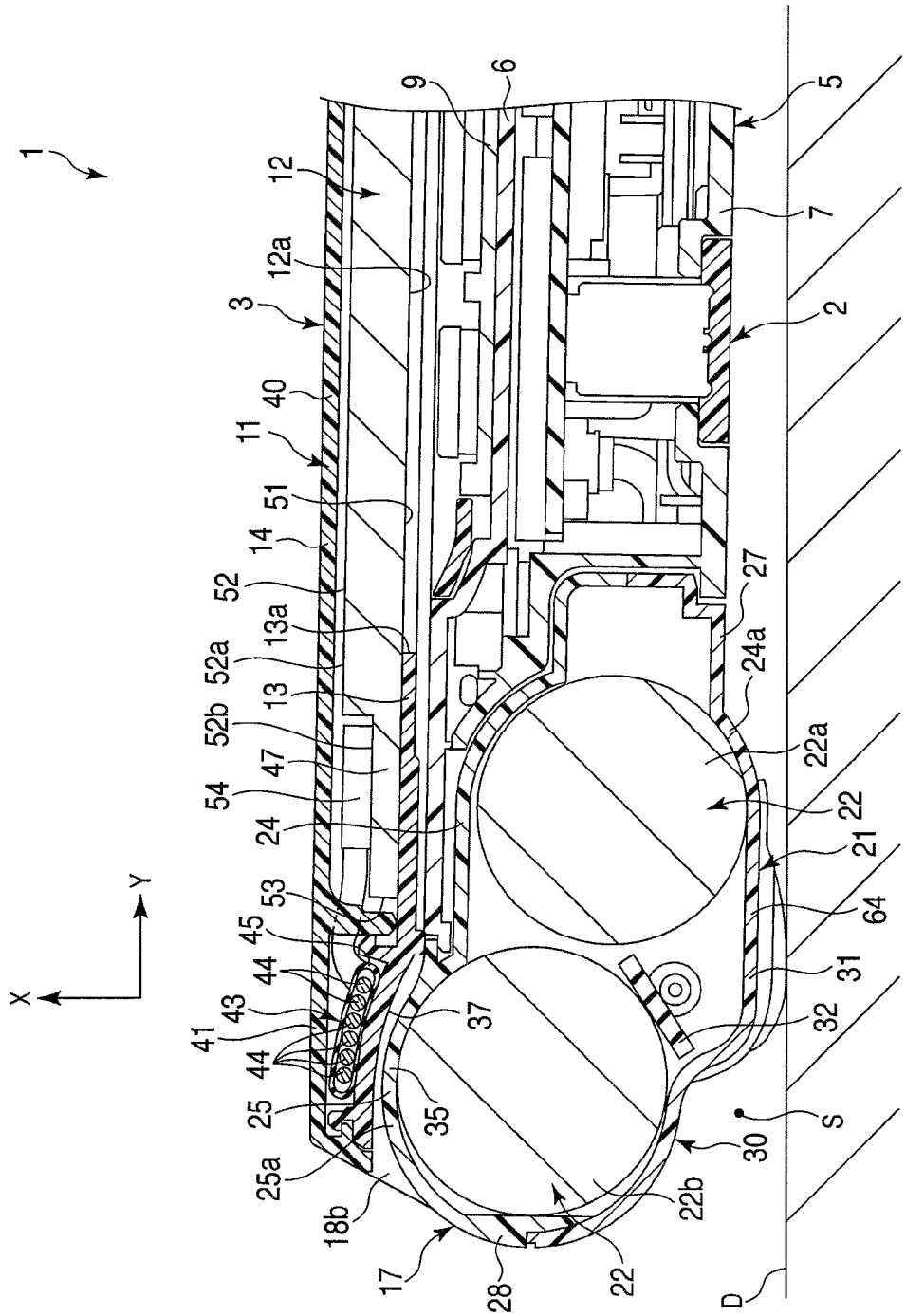
FIG. 13 is an exemplary sectional view of a modification of the electronic apparatus shown in FIG. 1.

The cables 44 need not be arranged abreast in a direction substantially orthogonal to the thickness direction of the display housing 11, and may be arranged abreast along the inner surface of the concave portion 37 as shown in FIG. 13. This structure also makes it possible to realize a thinner and higher-density mounting electronic apparatus.

The embodiments may not necessarily be embodied just as described above, and the structural elements of the embodiments may be modified within the spirit of the invention in the stage of implementation. Further, the embodiment is variously embodied by appropriately combining a plurality of structural elements disclosed in the above embodiments. For example, some structural elements may be omitted from all the structural elements disclosed in the above embodiments. Moreover, structural elements in different embodiments may be combined where necessary.

From the viewpoint of increasing the rotatable angle of the display housing 11, the concave portion 37 of the display housing 11 may not be provided. Even if the concave portion 37 is not provided in the display housing 11, provision of the concave portion 30 to the battery pack 17 can increase the rotatable angle of the display housing 11.

From the viewpoint of realizing a thinner and higher-density mounting electronic apparatus, the concave portion 30 of the battery pack 17 may not be provided. The electronic apparatus 1 can be made thinner by providing the display housing 11 with the concave portion 37 corresponding to the convex portion 35 of the battery pack 17. Further, high-density mounting is enabled by arranging a plurality of cables abreast in a direction crossing the thickness direction of the display housing 11 in the end portion 41 of the display housing 11 provided with the concave portion 37. The cables may not necessarily be connected to the display device 12, and may be connected to, for example, an antenna or a camera module.

From either viewpoint described above, the battery pack 17 may not necessarily comprise the first cell 22a and second cell 22b. The hinges 4a, 4b are not limited to the ones supporting the protrusions 18a, 18b protruding to the respective sides of the battery pack 17 as described in the above embodiment, and may have a different structure. The display housing 11 may not necessarily be configured to open substantially 180 degrees, and may be configured to rotate through only to a predetermined angle less than 180 degrees.

The display housing 11 may not necessarily be located below the upper surface of the keyboard 9 in the second position. The battery pack 17 may not necessarily comprise the bulge 31. The cables 44 may be connected to a left or right end portion of the display device 12, not the end portion 47 extending along the concave portion 37 of the display device 12. The cables 44 may be connected to a connector protruding from the back surface of the display device 12. The hinge attachment portion 19 may not necessarily comprise the convex portion 61, and may be flat.

In this specification, some members are described by assigning numbers such as "first" and "second." Those numbers are assigned for explanation, and may be changed where necessary.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first housing comprising a first end;
a second housing comprising a second end and a display device, the display device comprising a display screen;
a hinge attached to the first end, the hinge configured to attach the second housing to the first housing rotatably between a first position and a second position, the display screen covered with the first housing in the first position and the display screen not covered with the first housing in the second position; and
a battery pack configured to be attached to the first end and comprising a third end, the third end comprising a first recess into which the second end is configured to be inserted in the second position.

2. The electronic apparatus of claim 1, wherein,
the first recess comprises a concave surface hollowing toward an inside of the battery pack, and
the second end is configured to face the concave surface in the second position.

3. The electronic apparatus of claim 1, wherein,
the second end is configured to cover the battery pack from an upper side in the first position.

4. The electronic apparatus of claim 1, wherein,
the first housing is configured to be on an outer placement surface, and
the first recess is configured to face the outer placement surface.

5. The electronic apparatus of claim 4, wherein,
the second housing comprises a rear wall, the rear wall covering a rear surface of the display device, and
a part of the rear wall is configured to enter between the first recess and the outer placement surface in the second position.

6. The electronic apparatus of claim 1, wherein,
the first housing comprises an input receiving portion,
the hinge comprises a rotation shaft, and
an edge of the second end is configured to be closer to the input receiving portion than the rotation shaft in the second position.

7. The electronic apparatus of claim 1, wherein,
the first housing comprises an input receiving portion,
wherein the entire second housing is configured to be lower than a top of the input receiving portion in the second position.

8. The electronic apparatus of claim 1, wherein,
the first housing comprises a pair of protrusions on respective sides of the battery pack, the rotation shaft configured to support one of the protrusions,
each of the pair of protrusions comprises a second recess into which a part of the second end is configured to be inserted in the second position.

9. The electronic apparatus of claim 1, wherein,
the second housing is rotated substantially 180 degrees in the second position relative to the first position.

10. The electronic apparatus of claim 1, wherein,
the battery pack comprises a first portion and a second portion, the second portion protruding higher than the first portion, and
the second housing comprises a third recess, the third recess configured to face the second portion of the battery pack in the first position and to accommodate a part of the second portion.

11. The electronic apparatus of claim 1, wherein
the second end is thinner than another portion of the second housing.

12. An electronic apparatus comprising:
a first housing comprising a first end, the first housing configured to be on an outer placement surface;
a second housing comprising a second end and a display device, the display device comprising a display screen;
a hinge attached to the first end, the hinge configured to attach the second housing to the first housing rotatably between a first position and a second position, the display screen covered with the first housing in the first position and the display screen not covered with the first housing in the second position; and
a battery pack configured to be attached to the first end and comprising a third end, the third end comprising a first recess, the first recess configured to face the outer placement surface,
wherein the second end is configured to enter between the first recess and the outer placement surface so that the second end is not come into contact with first housing and the outer placement surface in the second position.

13. The electronic apparatus of claim 12, wherein,
the first recess comprises a concave surface hollowing toward an inside of the battery pack, and
the second end is configured to enter between the concave surface and the outer placement surface in the second position.

14. The electronic apparatus of claim 12, wherein,
the first housing comprises an input receiving portion,
wherein the entire second housing is configured to be lower than a top of the input receiving portion in the second position.

15. The electronic apparatus of claim 12, wherein
the second end is configured to cover the battery pack from an upper side in the first position.

16. The electronic apparatus of claim 12, wherein
the second housing comprises a rear wall, the rear wall covering a rear surface of the display device, and
a part of the rear wall is configured to enter between the first recess and the outer placement surface in the second position.

17. The electronic apparatus of claim 12, wherein
the battery pack comprises a first cell, a second cell, a bulge and a component, the bulge bulging toward the outer placement surface between the first cell and the second cell, and the component accommodated in the bulge.

18. The electronic apparatus of claim 12, wherein
the battery pack comprises a first portion and a second portion, the second portion protruding higher than the first portion, and
the second housing comprises a second recess, the second recess configured to face the second portion of the battery pack in the first position and to accommodate a part of the second portion.

19. The electronic apparatus of claim 12, wherein
the second end is thinner than another portion of the second housing.

20. The electronic apparatus of claim 12, wherein
the second housing is rotated substantially 180 degrees in the second position relative to the first position.

* * * * *